United States Patent
Hu et al.

(10) Patent No.: US 10,827,814 B2
(45) Date of Patent: *Nov. 10, 2020

(54) ELECTRIC GRINDER

(71) Applicant: Jiankun Hu, Shenzhen (CN)

(72) Inventors: Jiankun Hu, Shenzhen (CN);
Jianchang Hu, Shenzhen (CN); Feiran Hu, Shenzhen (CN); Feifan Hu, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/055,033

(22) Filed: Aug. 4, 2018

(65) Prior Publication Data
US 2018/0338598 A1    Nov. 29, 2018

Related U.S. Application Data

(63) Continuation of application No. PCT/CN2016/112180, filed on Dec. 26, 2016.

(30) Foreign Application Priority Data

Feb. 19, 2016  (CN) .......................... 2016 1 0096021

(51) Int. Cl.
*A45D 29/05* (2006.01)
*H02K 33/16* (2006.01)
(Continued)

(52) U.S. Cl.
CPC .............. *A45D 29/05* (2013.01); *B24B 23/00* (2013.01); *H02K 7/14* (2013.01); *H02K 33/16* (2013.01); *A45D 29/14* (2013.01)

(58) Field of Classification Search
CPC ........ A45D 29/05; A45D 29/14; A45D 29/06; A45D 29/12; A45D 29/04;
(Continued)

(56) References Cited

U.S. PATENT DOCUMENTS 3,030,967 A * 4/1962 Peyron .................. A45D 40/28
                                                      132/333
4,438,767 A * 3/1984 Nelson .................. A61B 90/00
                                                      30/169

(Continued)

FOREIGN PATENT DOCUMENTS

CN          1830403 A     9/2006
CN        102214980 A    12/2006
(Continued)

OTHER PUBLICATIONS

International Search Report.
Last Chinese Office Action.

*Primary Examiner* — Yogesh P Patel
*Assistant Examiner* — Jennifer Gill
(74) *Attorney, Agent, or Firm* — Wayne & Ken, LLC; Tony Hom

(57) ABSTRACT

Provided is an electric grinder. The grinder includes a swing motor and a grinding head driven by the swing motor. The swing motor further includes a U-shaped yoke, four permanent magnets and a swing arm. Alternating magnetic poles can be generated at end faces of the two legs under control of a control circuit. The four permanent magnets are sequentially distributed on the same circumference of a circle having the fulcrum as a center. The control circuit generates alternating pulses with adjustable pulse widths, which change the moving direction of the permanent magnets alternately, so that the permanent magnets move back and forth. The swing arm drives the grinding head to reciprocate at a high speed with small swinging amplitude, thereby cleaning the body surface (skin, nails or the like) of living bodies including human beings and animals.

4 Claims, 17 Drawing Sheets

(51) Int. Cl.
*H02K 7/14* (2006.01)
*B24B 23/00* (2006.01)
*A45D 29/14* (2006.01)

(58) Field of Classification Search
CPC .... A45D 2029/045; B24B 23/02; B24B 23/028; B24D 5/00; A61B 17/54
USPC ........................................................ 132/73.6
See application file for complete search history.

(56) References Cited

U.S. PATENT DOCUMENTS

| | | | | |
|---|---|---|---|---|
| 4,919,117 | A * | 4/1990 | Muchisky | A46B 13/02 15/28 |
| 6,378,157 | B1 * | 4/2002 | Kosla | A47L 11/164 15/230 |
| 7,288,863 | B2 * | 10/2007 | Kraus | B26B 19/282 310/37 |
| 8,418,302 | B1 | 4/2013 | Suen | |
| 2003/0187448 | A1 * | 10/2003 | Michelson | A61B 17/1757 606/79 |
| 2005/0280319 | A1 * | 12/2005 | Pilcher | H02K 33/16 310/36 |
| 2008/0106156 | A1 * | 5/2008 | Reishus | H02K 33/16 310/36 |
| 2009/0306577 | A1 * | 12/2009 | Akridge | A61M 35/003 604/20 |
| 2015/0072602 | A1 * | 3/2015 | Welch | B24D 5/16 451/547 |
| 2016/0270821 | A1 * | 9/2016 | Hendler | A61B 17/54 |
| 2017/0151653 | A1 * | 6/2017 | Whitman | A01K 13/00 |
| 2018/0361601 | A1 * | 12/2018 | Hu | B26B 19/12 |
| 2019/0140533 | A1 * | 5/2019 | Hu | A61C 17/26 |

FOREIGN PATENT DOCUMENTS

| | | |
|---|---|---|
| CN | 1981423 A | 6/2007 |
| CN | 102500002 A | 6/2012 |
| CN | 102665600 A | 9/2012 |
| CN | 103689902 A | 4/2014 |
| CN | 103784062 A | 5/2014 |
| CN | 104126268 A | 10/2014 |
| CN | 104347224 A | 2/2015 |
| CN | 204813631 U | 12/2015 |
| CN | 105598797 A | 5/2016 |
| CN | 205552218 U | 9/2016 |
| JP | 2001310252 A | 11/2001 |
| JP | 2002-325415 A | 11/2002 |
| JP | 2006-335483 A | 12/2006 |

* cited by examiner

ELECTRIC GRINDER

CROSS-REFERENCE TO RELATED APPLICATIONS

This application is a continuation of International Application No. PCT/CN2016/112180 with a filing date of Dec. 26, 2016, designating the United States, now pending, and further claims priority to Chinese application no. 201610096021.7 with a filing date of Feb. 19, 2016. The content of the aforementioned applications, including any intervening amendments thereto, are incorporated herein by reference.

FIELD OF THE INVENTION

The invention relates to a cleaning tool, in particular to a grinder driven by a motor for grinding nails or hard skins.

BACKGROUND OF THE INVENTION

A motor is an electromagnetic device that converts electric energy according to the law of electromagnetic induction. It is widely used in various fields. It is an indispensable prime mover in today's society and provides power source for a large number of electrical appliances or various machines.

An electric grinder is a device driven by a motor. An existing electric grinder usually uses a rotary motor which is a rotating electromagnetic machine operating on the principle of electromagnetic induction and used to realize the mutual conversion of mechanical energy and electrical energy. Existing nail grinders are divided into two types. One is that the rotary motor drives a cylindrical or conical grinding head to rotate at a high speed for polishing nails by professionals. The other is that a rotating motor accelerator or reducer rotates at a low speed to drive a disc-shaped sand paper to grind nails. Both of the structures have certain operating requirements, and excessive grinding will hurt the skin under the nails or the skin that comes into contact with them. There is also a hard skin remover which also uses a rotating motor accelerator or reducer that rotates at a low speed to drive a sand-surface roller. The sand surface of the roller grinds the hard skin. Excessive grinding will also hurt the skin under the hard skin. There are also existing nail clippers which are difficult for children to operate by themselves.

SUMMARY OF THE INVENTION

According to a first aspect, a novel electric grinder is provided in one embodiment.

The electric grinder comprises a swing motor and a grinding head driven by the swing motor, wherein the swing motor comprises:

a U-shaped yoke having a first leg and a second leg, the first leg and the second leg having coils wound thereon, respectively;

a control circuit electrically connected to the coils and generating alternating pulses such that end faces of the two legs of the U-shaped yoke generate alternating magnetic poles;

a swing arm swingable around a fulcrum, the swing arm extending outward from the end faces of the U-shaped yoke and bounded by the fulcrum, one end of the swing arm close to the U-shaped yoke being an inner arm, and the other end of the swing arm remote from the U-shaped yoke being an outer arm;

a second yoke mounted at one end of the inner arm close to the U-shaped yoke; and a first permanent magnet, a second permanent magnet, a third permanent magnet and a fourth permanent magnet fixedly mounted on the second yoke; the first permanent magnet, the second permanent magnet, the third permanent magnet and the fourth permanent magnet are sequentially distributed on the same circumference centered on the fulcrum; radial end faces of the first permanent magnet and the fourth permanent magnet have the same polarity, and radial end faces of the second permanent magnet and the third permanent magnet have the same polarity; and the radial end faces of the first permanent magnet and the second permanent magnet have opposite polarities and are arranged corresponding to an end face of the first leg; the radial end faces of the third permanent magnet and the fourth permanent magnet have opposite polarities and are arranged corresponding to an end face of the second leg; an air gap is provided between the end faces of the first permanent magnet and the second permanent magnet and of the corresponding first support leg and an air gap is provided between the end faces of the third permanent magnet and the fourth permanent magnet and of the supporting second support leg; and the grinding head is connected with the swing arm which drives the grinding head to swing back and forth.

As a further improvement of the electric grinder, the gap between the first permanent magnet and the second permanent magnet is smaller than the width of the end face of the first leg, and the gap between the third permanent magnet and the fourth permanent magnet is smaller than the width of the end face of the second leg.

As a further improvement of the electric grinder, the radial end faces of the first permanent magnet, the second permanent magnet, the third permanent magnet the fourth permanent magnet have a width smaller than that of the end faces of the legs of the U-shaped yoke.

As a further improvement of the electric grinder, a first circular arc surface is provided at the end faces of the first support leg matching with a circumference formed when the first permanent magnet and the second permanent magnet swing and a second circular arc surface is provided at the end faces of the second support leg matching with a circumference formed when the third permanent magnet and the fourth permanent magnet swing. As a further improvement of the electric grinder, an outer wall of the grinding head has at least one grinding surface with a rough surface.

As a further improvement of the electric grinder, the outer wall of the grinding head is formed with at least one groove, a bottom wall of the groove is a grinding surface with a rough surface, and side walls of the groove are smooth surfaces.

As a further improvement of the electric grinder, the grinding surface is a circular arc surface centered on a swinging central axis.

As a further improvement of the electric grinder, the grinding head and the swing arm are of an integrated structure, and the grinding surface is made on the swing arm; or the grinding head is fixedly coupled with the swing arm.

According to the electric grinder of the above embodiment, the radial end faces of the first permanent magnet and the fourth permanent magnet of the four permanent magnets have the same polarity, the radial end faces of the second permanent magnet and the third permanent magnet have the same polarity, and the radial end faces of the second permanent magnet and the first permanent magnet have opposite polarities. When the coils are energized, all four permanent magnets will produce torque in the same rotational direction. The control circuit generates alternating pulses with adjustable pulse widths, which change the moving direction of the permanent magnets alternately, so that the permanent magnets move back and forth, and the swing arm drives the grinding head to reciprocate, thereby cleaning the skin, nails and the like of living bodies including human beings and animals. Each leg of the U-shaped yoke corresponds to two permanent magnets. The redundant design of the permanent magnets is a magnetic circuit design different from that of the prior art, which has larger torque, larger acting magnetic flux and correspondingly reduced driving power, as compared with prior electric motors with the same power.

DETAILED DESCRIPTION

Embodiment 1

Figure 1:
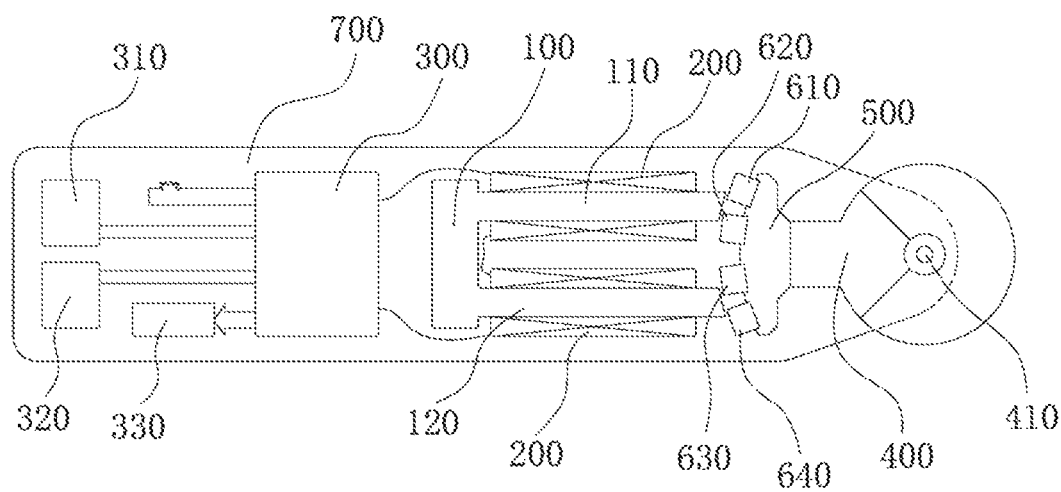
FIG. 1 is a schematic structural view of an embodiment of the electric grinder according to the present invention.

The first embodiment provides an electric grinder for cleaning body surface of a living body.

The living body referred to herein includes human beings and animals, and human beings will be taken as an example for description below.

An electric sound wave cleaning brush comprises a swing motor and a grinding head, wherein the swing motor outputs a reciprocating swinging motion, and the grinding head is driven by the swing motor to swing.

With reference to FIGS. 1, 2, 3, 4, 5, the swing motor includes:

a U-shaped yoke 100 having a first leg 110 and a second leg 120, the first leg 110 and the second leg 120 having coils 200 wound thereon, respectively;

a control circuit 300 electrically connected to the coils 200 and generating alternating pulses such that end faces 111,121 of the two legs of the U-shaped yoke 100 generate alternating magnetic poles;

a swing arm 400 swingable about a fulcrum, the swing arm 400 extending outward from the end faces 111,121 of the U-shaped yoke 100 and bounded by the fulcrum, one end of the swing arm 400 close to the U-shaped yoke 100 being an inner arm 420, and the other end of the swing arm 400 remote from the U-shaped yoke 100 being an outer arm 430:

a second yoke 500 (referred to as the second yoke 500 so as to be distinguished from the U-shaped yoke 100) mounted at one end of the inner arm 420 close to the U-shaped yoke 100; and four permanent magnets fixedly mounted, for example by gluing, on the second yoke 500, wherein the four permanent magnets are sequentially distributed on the same circumference of a circle having the fulcrum as a center in the sequence of a first permanent magnet 610, a second permanent magnet 620, a third permanent magnet 630 and a fourth permanent magnet 640. Radial end faces 611, 641 of the first permanent magnet 610 and the fourth permanent magnet 640 have the same polarity; radial end faces 621, 631 of the second permanent magnet 620 and the third permanent magnet 630 have the same polarity; a radial end face 611 of the first permanent magnet 610 and a radial end face 621 of the second permanent magnet 620 have opposite polarities and are arranged corresponding to an end face 111 of the first leg 110; a radial end face 631 of the third permanent magnet 630 and a radial end face 641 of the fourth permanent magnet 640 have opposite polarities and are arranged corresponding to an end face 121 of the second leg 120; and there are air gaps between the end faces of the permanent magnets and the end faces of corresponding legs.

The sequential distribution of the four permanent magnets on the same circumference of a circle having the fulcrum as the center means that the four permanent magnets are approximately equal in radius to the fulcrum, i.e., radially distributed along a swing center line.

The U-shaped yoke 100, the swing arm 400, the second yoke 500, and the permanent magnet are mounted in a housing 700, wherein the fulcrum of the swing arm 400 is a swing shaft 410 fixedly mounted on the housing 700, and the swing arm 400 is sleeved on the swing shaft 410. The housing 700 described herein may be a housing dedicated to the motor or a housing of a grinder using the motor.

When the coils 200 are energized, all four permanent magnets will produce torque in the same rotational direction. If the first and third permanent magnets 610, 630 generate the same magnetic attraction force to the U-shaped yoke 100 after being energized, the second and fourth permanent magnets 620, 640 generate the same magnetic repulsion force to the U-shaped yoke 100. When the coils are reversely energized, if the first and third permanent magnets 610, 630 generate the same magnetic repulsion force to the U-shaped yoke 100, the second and fourth permanent magnets 620, 640 generate the same magnetic attraction force to the U-shaped yoke 100. Each leg of the U-shaped yoke corresponds to two permanent magnets. The redundant design of the permanent magnets is a magnetic circuit design different from that of the prior art, which has larger torque, larger magnetic flux and thus reduced driving power, as compared with prior electric motors with the same power.

The four permanent magnets are subjected to the force of the U-shaped yoke 100 in the same swing direction at the same time, which ensures that the swing arm 400 can swing back and forth without external force.

Figure 3:
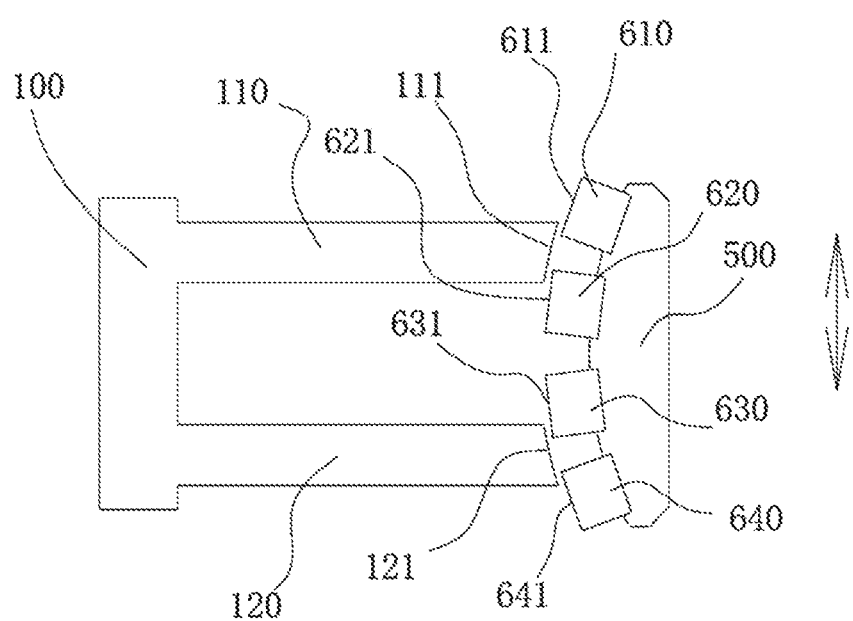
FIG. 3 is a schematic view showing the cooperation between permanent magnets and U-shaped yoke legs in the swing motor shown in FIG. 1.
Figure 4:
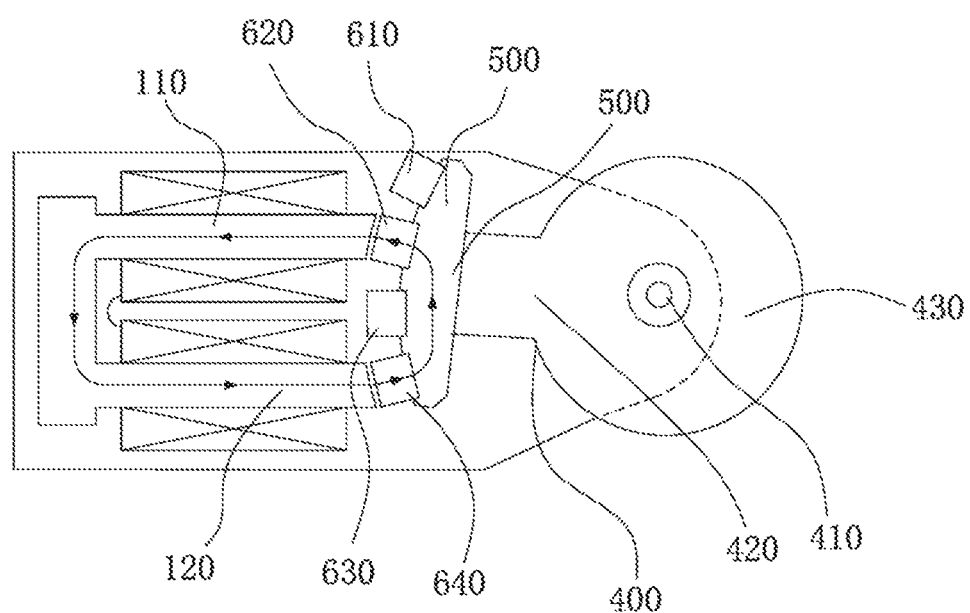
FIG. 4 is a schematic view of the embodiment shown in FIG. 1 in an energized state.
Figure 5:
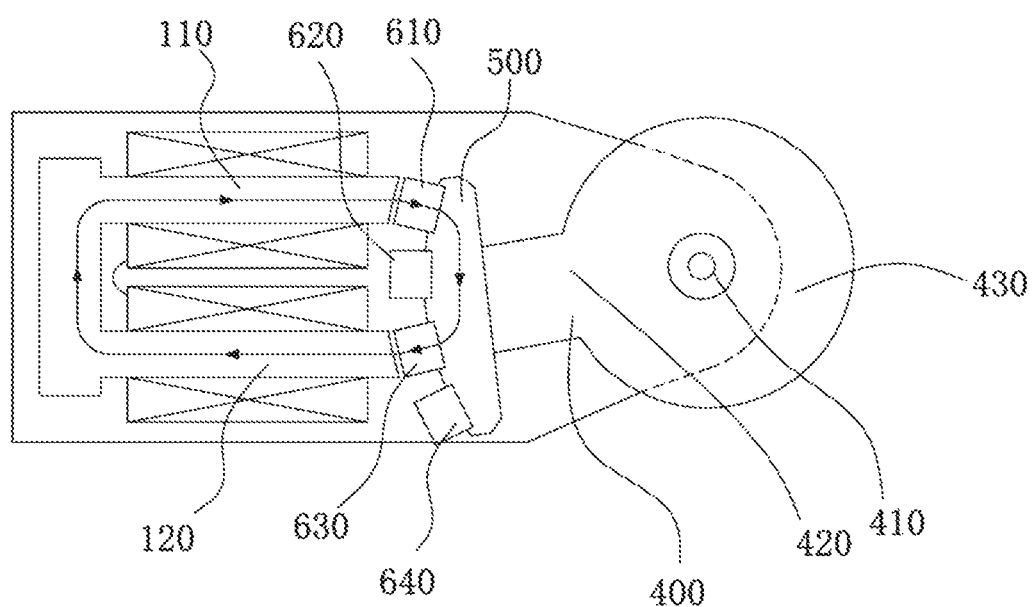
FIG. 5 is a schematic view of the embodiment shown in FIG. 1 in a reversely energized state as opposed to that of FIG. 4.

Specifically, with reference to FIGS. 3, 4, and 5, it is assumed that the end faces of the first permanent magnet 610 and the fourth permanent magnet 640 are the N pole, and the end faces of the second permanent magnet 620 and the third permanent magnet 630 are the South pole. When the coils 200 are energized, if the end face of the first leg 110 is N pole and the end face of the second leg 120 is S pole, the N pole of the first leg 110 will generate an attraction force to the S pole of the second permanent magnet 620, and a repulsion force to the N pole of the first permanent magnet 610. Similarly, the S pole of the second leg 120 will generate an attraction force to the N pole of the fourth permanent magnet 640, and a repulsive force to the S pole of the third permanent magnet 630, thus causing the swing arm 400 to swing from the position shown in FIG. 3 to the position shown in FIG. 4 to form a first swing, but at higher frequencies, the swing arm does not need to swing into place.

When the direction of current in the coils 200 changes, as shown in FIG. 5, the end face of the first leg 110 is the S pole and the end face of the second leg 120 is the N pole, so that the S pole of the first leg 110 will generate a repulsive force to the S pole of the second permanent magnet 620, and an attraction force to the N pole of the first permanent magnet 610. Similarly, the N pole of the second leg 120 will generate a repulsive force to the N pole of the fourth permanent magnet 640, and an attraction force to the S pole of the third permanent magnet 630, thus causing the swing arm 400 to swing from the position shown in FIG. 4 to the position shown in FIG. 5 to form a second swing, but at higher frequencies, the swing arm does not need to swing into place.

In summary, the coils 200 are connected to the control circuit 300 which generates alternating pulses with adjustable pulse widths, such that the end faces of the U-shaped yoke 100 generate alternating magnetic poles, causing the permanent magnets to generate an attraction torque and a repulsion torque, or a repulsion torque and an attraction torque, to drive the swing arm 400 to swing, thereby driving corresponding mechanical units to swing by the swing arm 400.

Further, as shown in FIG. 3, a gap between the first permanent magnet 610 and the second permanent magnet 620 can be made smaller than the width of the end face 111 of the first leg 110, and a gap between the third permanent magnet 630 and the fourth permanent magnet 640 can be made smaller than the width of the end face 121 of the second leg 120, so as to ensure that the legs of the U-shaped yoke 100 have sufficient applied force on each permanent magnet.

Furthermore, the width of each permanent magnet can be made the same as or different from the end face width of the legs of the U-shaped yoke 100, for example, the width of each permanent magnet is smaller than the end face width of the legs of the U-shaped yoke 100. The width here refers to the width in the direction indicated by the arrow in FIG. 3.

In order to reduce air gaps, as shown in FIG. 3, the end faces 111, 121 of the first leg 110 and the second leg 120 can have a circular arc surface matching the circumference corresponding to the swing of the permanent magnets, i.e., there are only air gap spacing between the circular arc surfaces formed by the end faces 111, 121 of the first leg 110 and the second leg 120 and a circular arc segment of the circumference formed when the permanent magnets swing.

Figure 6:
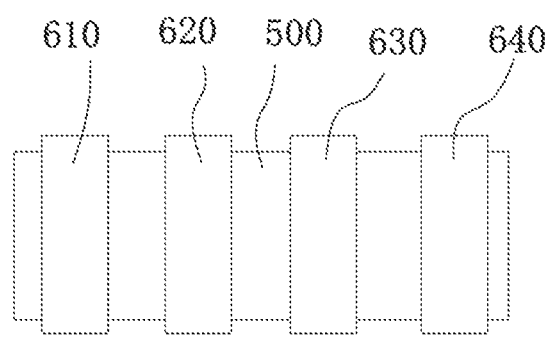
FIG. 6 is a first exploded schematic view of radial end faces of four permanent magnets in the embodiment shown in FIG. 1.
Figure 7:
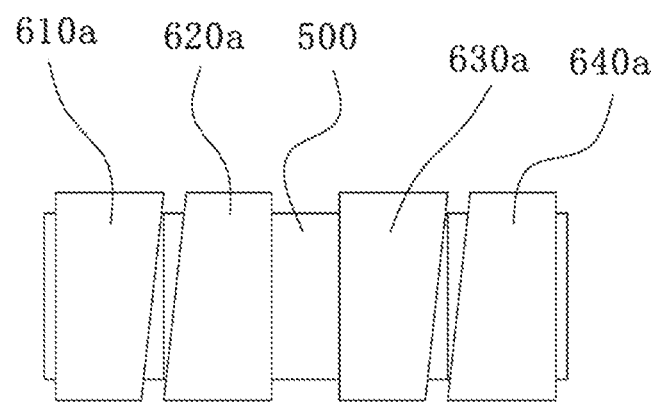
FIG. 7 is a second exploded schematic view of the radial end faces of the four permanent magnets in the embodiment shown in FIG. 1.
Figure 8:
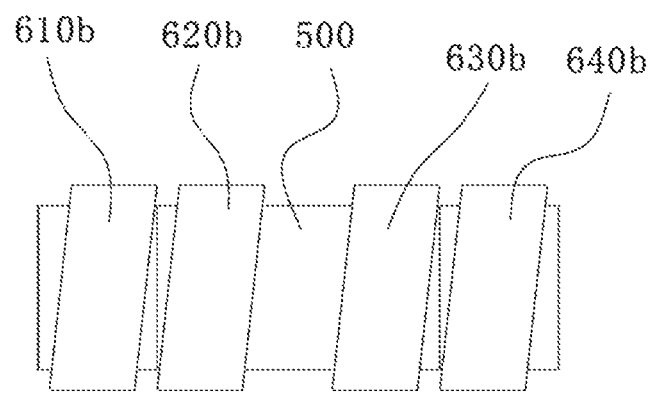
FIG. 8 is a third exploded schematic view of the radial end faces of the four permanent magnets in the embodiment shown in FIG. 1.

With reference to FIG. 6, the radial end faces of the four permanent magnets are arranged in a substantially rectangular shape as shown in FIG. 6. In addition, the radial end faces of the permanent magnets may also be provided in other shapes. As shown in FIG. 7, the radial end faces of the first permanent magnet 610a and the second permanent magnet 620a are arranged such that adjacent sides are inclined and parallel to each other, and the radial end faces of the third permanent magnet 630a and the fourth permanent magnet 640a are arranged such that adjacent sides are inclined and parallel to each other, i.e., the second permanent magnet 620a and the fourth permanent magnet 640a are substantially right-angled trapezoids arranged in the same direction, while the first permanent magnet 610a and the third permanent magnet 630a are also right-angled trapezoids of the same shape, but in an opposite direction to the second permanent magnets 620a and the fourth permanent magnet 640a. Alternatively, as shown in FIG. 8, the radial end faces of the four permanent magnets are all arranged to be inclined and parallel to each other, and are all substantially parallelogram-shaped.

In the permanent magnet arrangement shown above, the permanent magnets are staggered, which can improve the output torque curve and smooth the output torque.

Furthermore, the grinding head of this embodiment can be integrated with the swing arm or fixedly coupled with the swing arm, and an out wall of the grinding head of the electric grinder has at least one grinding surface with a rough surface. The grinding surface can be made of commonly used grinding materials, and different grinding surface materials can be selected according to different grinding objects such as nails or hard skins.

Figure 2:
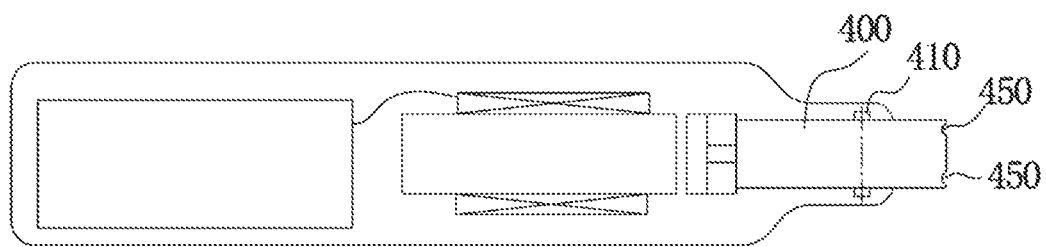
FIG. 2 is a schematic side view of the structure of the embodiment shown in FIG. 1.

For example, referring to FIGS. 1 and 2, the grinding head is integrated with the swing arm 400. The entire swing arm 400 is equivalent to a grinding head, and the grinding surface can be directly formed on the swing arm 400.

Of course, in other embodiments, the grinding head and the swing arm 400 may also be fixed by common fixing methods, for example, the grinding head may be fixed to the swing arm 400 by inlaying or clamping.

Figure 9:
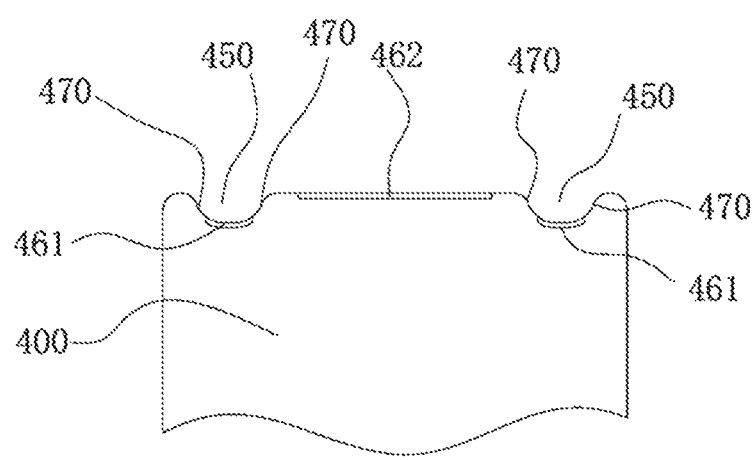
FIG. 9 is a partially enlarged schematic view of a grinding head of the structure shown in FIG. 2.

Specifically, as shown in FIGS. 2 and 9, the outer wall of the grinding head is formed with at least one groove 450, a bottom wall of which is a grinding surface 461 having a rough surface, and the grinding surface 461 may be circular arc-shaped. When vibrating, the grinding surface can grind the nails and will not hurt the skin due to small swing amplitude. The side walls and/or edges of the groove 450 are smooth surfaces 470. After putting a nail into the groove 450, the nail can be grinded when the grinding surface vibrates, while the convex smooth surface 470 abuts against the skin under the nail, which will not cause excessive grinding and thus hurt the skin. Therefore, even children and people with poor eyesight can grind the nail by themselves.

In addition, as shown in FIG. 9, the end face of the outer wall of the grinding head except for the groove 450 may be a grinding face 462 with a large mesh for polishing the nail surface.

Figure 10:
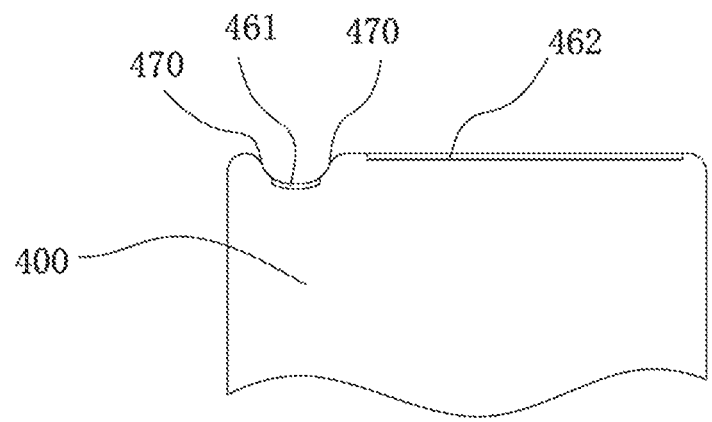
FIG. 10 is a partially enlarged schematic view of a second grinding head.

Further, referring to FIG. 10, it is also possible to provide only one groove 450, and one side of the groove 450 is provided with a grinding surface 462 with a large mesh for polishing the nail surface.

Figure 11:
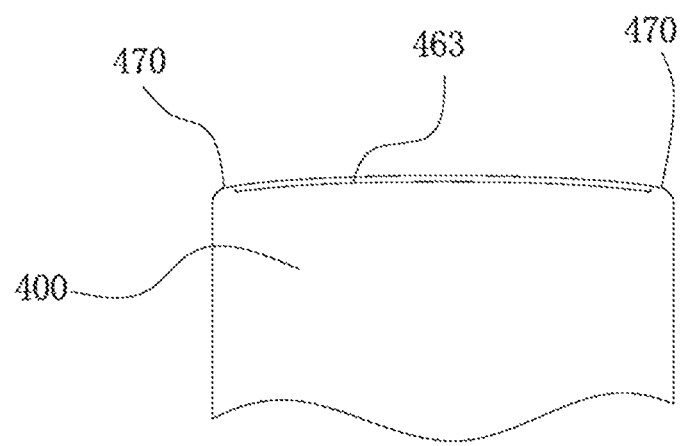
FIG. 11 is a partially enlarged schematic view of a third grinding head.

Further, referring to FIG. 11, it is also possible that both sides of the end face of the grinding head are provided with smooth surfaces 470 and a middle portion of the end face is provided with a grinding surface 462 for grinding hard skin.

Figure 12:
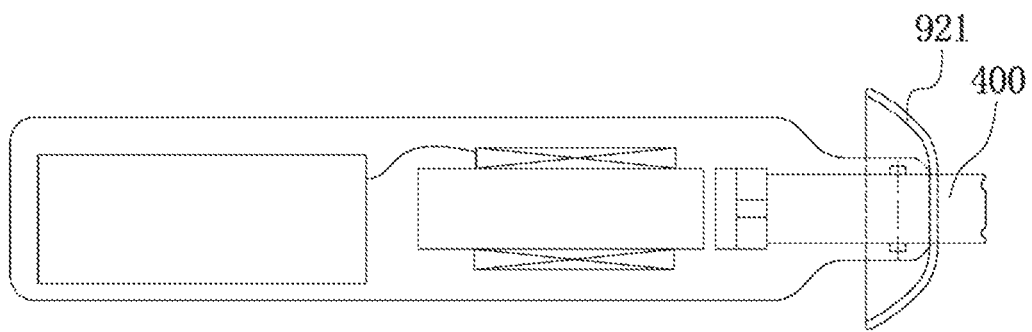
FIG. 12 is a schematic structural view of the embodiment shown in FIG. 1 after a sheath is added.

A sheath of soft material may also be provided to prevent ground debris from falling onto the handle portion. The sheath may have a structure as indicated by 921 in FIG. 12, or may also be a sheath of other shapes.

In addition, the grinding surface for grinding hard skin can be a circular arc surface taking the center of swinging as a center, and the circular-arc grinding surface of the grinding head may be slightly deviated from the center of swinging, so that the grinding surface has slight vibration. This can not only grind hard skin, but also have massage effect.

The outer arm 430 of the swing arm 400 is an output arm, an external force arm is smaller than an internal force arm, an internal force arm distance is a distance from the radial end face of the permanent magnets to the center of the swing shaft 410, and an external force arm distance is a distance from the center of the swing shaft 410 to the center of the outer arm 430. Here, the ratio of the length of the inner arm 420 to the length of the outer arm 430 can also be designed according to the requirement on the swing amplitude.

In each swinging process, the four permanent magnets are actually subjected to forces swinging in the same direction. The output moment=output force×external force arm=(F1+F2+F3+F4)×internal force arm, and F1, F2, F3, F4 are the forces exerted by the U-shaped yoke 100 on the four permanent magnets, respectively.

Referring to FIG. 1, in the power-off state of the swing motor, the first and second permanent magnets 610, 620 form a closed magnetic circuit with the first leg 110 through the air gaps, and the third and fourth permanent magnets 630, 640 form a closed magnetic circuit with the second leg 120 through the air gaps, thus avoiding magnetic leakage. Moreover, the permanent magnets and the second yoke 500 are mounted on the swing arm 400, so that other portions of the swing arm 400 will not affect the magnetic field.

In addition, with reference to FIG. 1, the grinder may further include a rechargeable battery 310 for supplying power, and a charging module 320 connected to the control circuit for charging the rechargeable battery 310.

The control circuit may further include a state indicating module 330 for indicating the operating state of the motor, and a switch for triggering signals to the control circuit to control the turning on and off of the motor.

Further, the control circuit 300 can determine the number of mechanical swings by counting the pulses of the energized coils, and output signals to give corresponding instructions to the operating conditions of the mechanical units.

The swing arm of the swing motor swings around the fulcrum, and the service life of the matching structure of the fulcrum and the swing arm is the service life of the motor. For example, the swing arm is mounted on the swing shaft through a bearing, and the service life of the bearing is the service life of the motor. Therefore, the service life of the motor is extremely long, and an existing brushed DC motor is not comparable in this regard. Alternatively, the swing arm can be directly sleeved on the swing shaft, and the service life of this sleeved structure is the service life of the motor.

The swing motor has small power consumption, large torque, long service life and stable current, can be powered by rechargeable batteries, and is suitable for portable design.

Since the grinding head swings at a high frequency with very small swing amplitude, the electric grinder using the swing motor will only grind the hard skin without damaging the soft skin underneath even if it comes into contact with the skin. The soft skin will swing with the grinding head, and it also has a massage function. Due to the design of groove of the grinding head, after putting a nail into the groove, the nail can be grinded when the grinding surface vibrates, while the convex smooth surface abuts against the skin under the nail, which will not cause excessive grinding and thus hurt the skin. Therefore, even children and people with poor eyesight can grind the nail by themselves.

Embodiment 2

In embodiment 2, another swing motor is provided.

Figure 13:
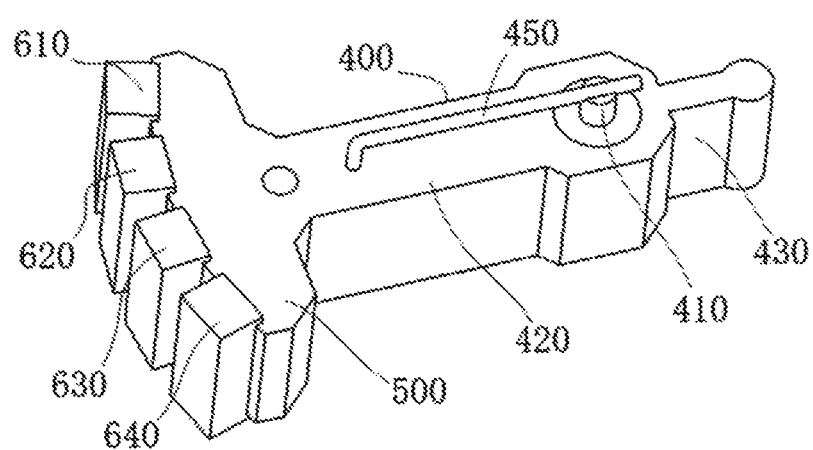
FIG. 13 is a schematic structural view of a second embodiment of the swing motor according to the present invention.

With reference to FIG. 13, the swing motor is improved in the structure shown in embodiment 1 by adding a resonant elastic member for generating resonance at a constant swing frequency.

Specifically, one end of the resonant elastic member is fixed on the fulcrum of the swing arm, and the other end of the resonant elastic member is connected to the outer arm or the inner arm.

Figure 14:
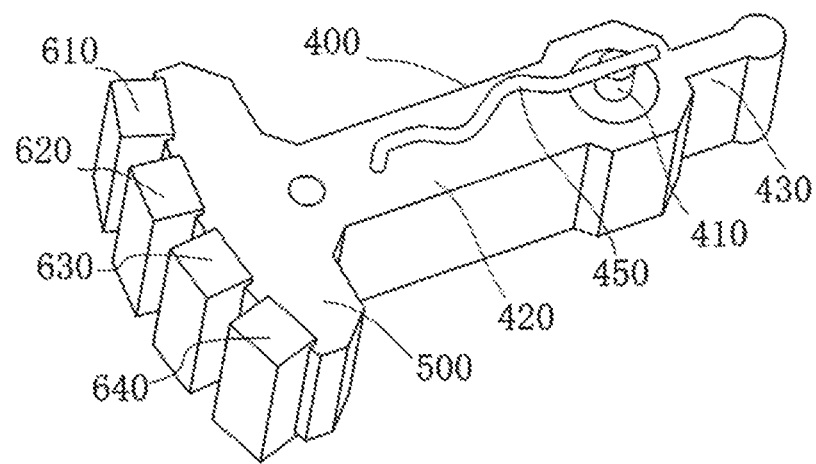
FIG. 14 is a schematic view showing another shape of a resonant elastic member in the embodiment shown in FIG. 13.

Further, the resonant elastic member shown in FIG. 13 is a linear spring steel wire, and may be replaced with an elastic member of other shapes. As shown in FIG. 14, a middle portion of the resonant elastic member is bent.

Embodiment 3

In embodiment 3, another electric grinder is provided.

Figure 15:
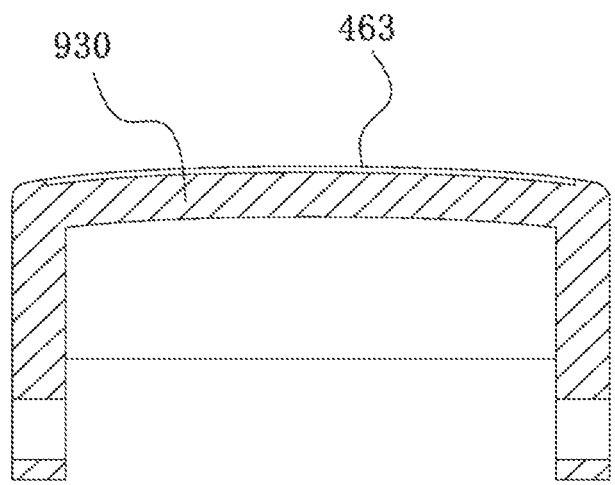
FIGS. 15 and 16 are schematic structural views of a second grinding head of another electric grinder according to the present invention.
Figure 16:
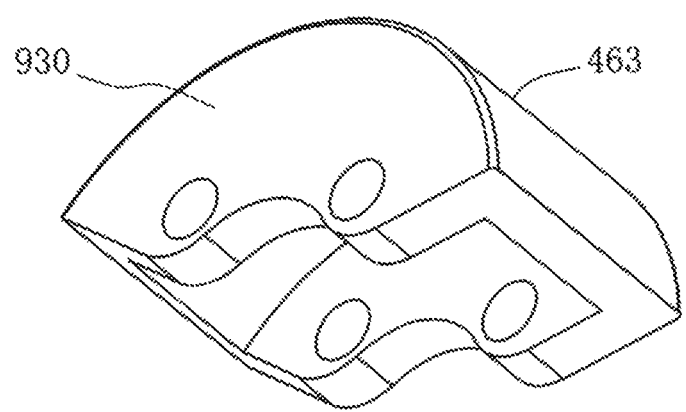
Figure 17:
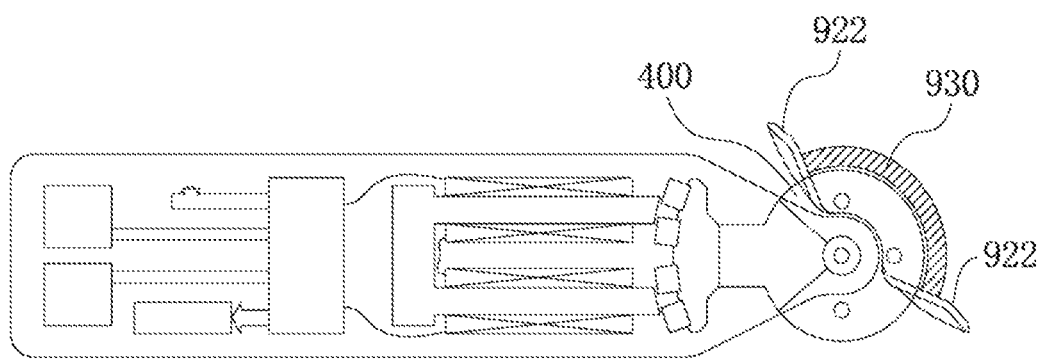
FIG. 17 is a schematic structural view of the second grinding head and sheath shown in FIGS. 15 and 16 after being added to the electric grinder.

With reference to FIGS. 15, 16 and 17, the electric grinder has been improved in the structure shown in embodiment 1. Two or more clamping holes are added to the original grinding head of FIG. 9 or FIG. 10, and a second grinding head 930 can be externally connected to the grinding head. The second grinding head 930 may have a circular arc of grinding surface 463, the cross section of which is as shown in FIG. 11, for grinding hard skin, and is fixed to the grinding head of FIG. 9 or FIG. 10 through two or more clamping holes.

Similarly, referring to FIG. 17, the second grinding head 930 may also be provided with a sheath 922 of soft material, which is disposed at the periphery of the second grinding head 930 to prevent the ground debris from moving to the handle portion.

In addition, the second grinding head 930 may also be a grinding head for grinding nails, whereas the original grinding head is a grinding head for grinding hard skin.

The present invention has been described by ways of specific examples, which are only intended to facilitate understanding of the present invention rather than limit the present invention. For those of ordinary skill in the art, changes can be made to the above specific embodiments according to the concepts of the present invention.

What is claimed is:

1. An electric grinder comprising a swing motor and a grinding head driven by the swing motor; wherein the swing motor comprises:
   a U-shaped yoke having a first leg and a second leg extending in a first plane; wherein the first leg and the second leg are wound with coils, respectively, and each of the first leg and the second leg has an end face extending in a second plane perpendicular to the first plane;

a control circuit electrically connected to the coils and generating alternating pulses such that end faces of the first leg and the second leg of the U-shaped yoke generate alternating magnetic poles;

a swing arm swingable around a fulcrum; wherein the swing arm extends in a direction parallel to the first plane and is bounded by the fulcrum; one end of the swing arm close to the U-shaped yoke is an inner arm; and the other end of the swing arm remote from the U-shaped yoke is an outer arm; the inner arm levers the outer arm to swing around the fulcrum in a swinging plane where the swing arm locates under the action of electromagnetic force;

a second yoke mounted at one end of the inner arm close to the U-shaped yoke for forming magnetic pathways; wherein the second yoke and the inner arm form a T-shaped structure; and a first permanent magnet, a second permanent magnet, a third permanent magnet and a fourth permanent magnet fixedly mounted on the second yoke; wherein the first permanent magnet, the second permanent magnet, the third permanent magnet and the fourth permanent magnet are sequentially distributed on a same circumference centered on the fulcrum; radial end faces of the first permanent magnet and of the fourth permanent magnet have a same polarity, and radial end faces of the second permanent magnet and of the third permanent magnet have a same polarity; and a radial end face of the first permanent magnet and a radial end face of the second permanent magnet have opposite polarities and are arranged corresponding to the end face of the first leg; a radial end face of the third permanent magnet and a radial end face of the fourth permanent magnet have opposite polarities and are arranged corresponding to the end face of the second leg; an air gap is provided between the end faces of the first permanent magnet and the second permanent magnet and of the corresponding first support leg and an air gap is provided between the end faces of the third permanent magnet and the fourth permanent magnet and of the supporting second support leg; and the radial end faces of the first permanent magnet, the second permanent magnet, the third permanent magnet and the fourth permanent magnet extend substantially parallel to the second plane, the radial end faces of the first permanent magnet and the second permanent magnet at least partially face to the end face of the first leg, and the radial end faces of the third permanent magnet and the fourth permanent magnet at least partially face to the end face of the second leg; and wherein the grinding head is formed on the swing arm and swings back and forth with the swing arm; an outer wall of the outer arm forms the grinding head, the grinding head having at least one rough surface forming a grinding surface;

at least one groove is provided on the outer wall with a bottom wall of the groove forming a first of the at least one rough grinding surface and a side wall of the groove having a smooth surface; a second of the at least one rough grinding surface is formed as an arc surface centered around the fulcrum.

2. The electric grinder according to claim 1, wherein a gap between the first permanent magnet and the second permanent magnet is smaller than a width of the end face of the first leg, and a gap between the third permanent magnet and the fourth permanent magnet is smaller than a width of the end face of the second leg.

3. The electric grinder according to claim 1, wherein each of the radial end faces of the first permanent magnet, the second permanent magnet, the third permanent magnet, and the fourth permanent magnet have a width smaller than a width of each of the end faces of the first and the second legs of the U-shaped yoke.

4. The electric grinder according to claim 1, wherein a first circular arc surface is provided at the end faces of the first support leg matching with a circumference formed when the first permanent magnet and the second permanent magnet swing; a second circular arc surface is provided at the end faces of the second support leg matching with a circumference formed when the third permanent magnet and the fourth permanent magnet swing.

* * * * *